April 6, 1954 — E. E. SIVACEK — 2,674,447
SPEEDOMETER
Filed April 22, 1950
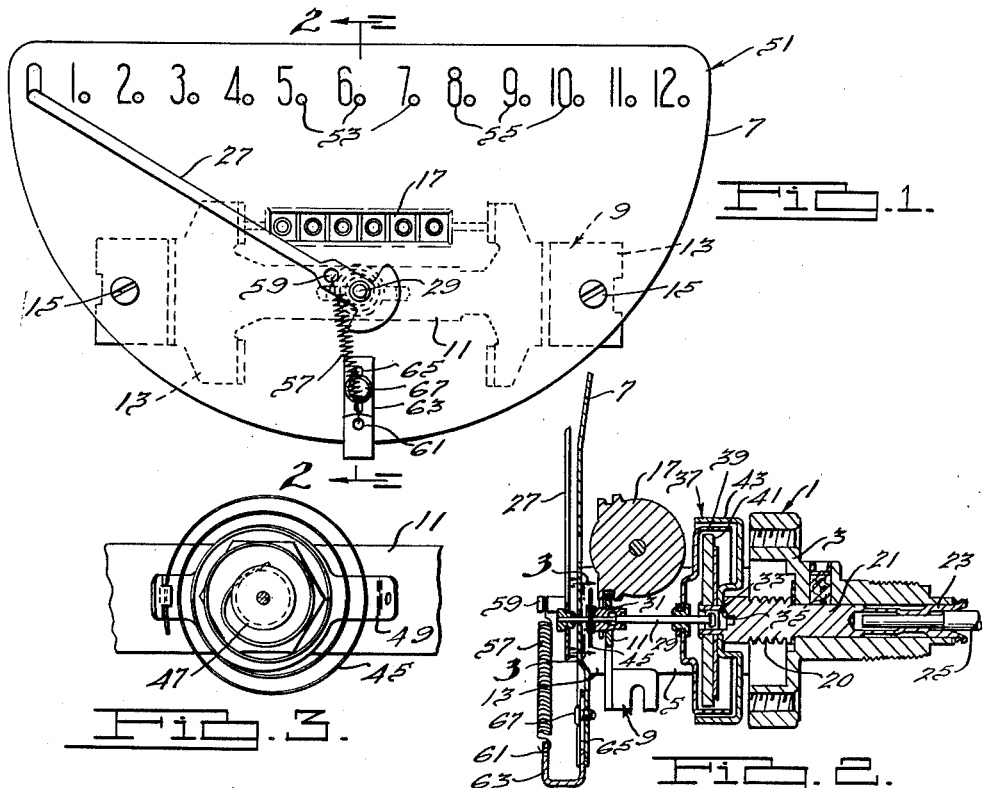
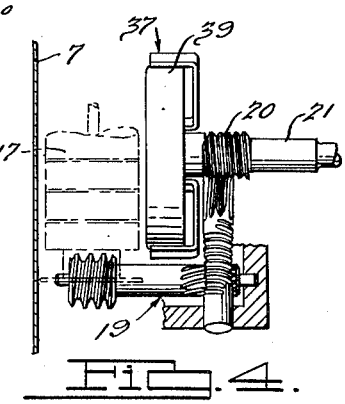
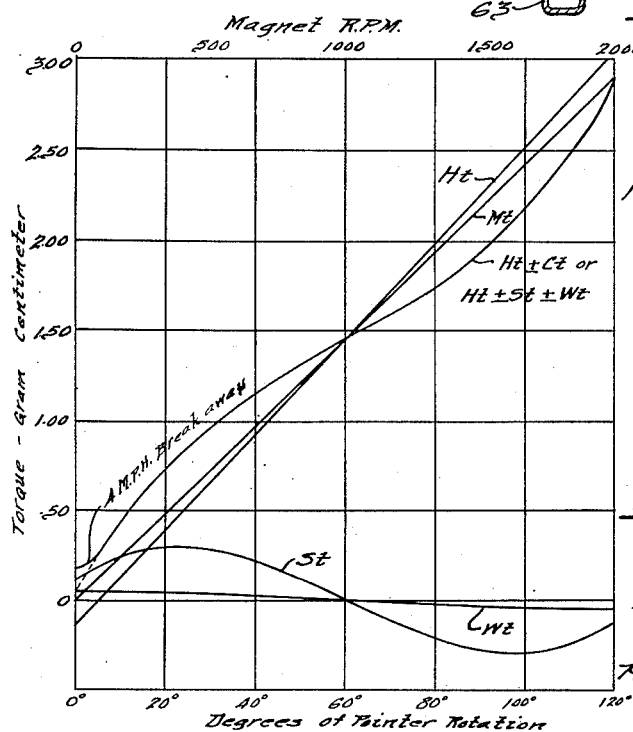
INVENTOR.
Emil E. Sivacek
BY
Harness, Dickey & Pierce
ATTORNEYS.

Patented Apr. 6, 1954

2,674,447

UNITED STATES PATENT OFFICE 2,674,447

SPEEDOMETER

Emil E. Sivacek, Ann Arbor, Mich., assignor to King-Seeley Corporation, Ann Arbor, Mich., a corporation of Michigan Application April 22, 1950, Serial No. 157,478

9 Claims. (Cl. 264—13)

This invention relates to indicating and measuring devices, such as automobile speedometers, of the type in which the signal to be read is indicated by the position of a pivotal pointer on a scale, the invention being especially but not exclusively concerned with devices having rectilinear scales.

In conventional measuring devices wherein a pivotal pointer moves in response to changes in the signal to be measured, the design or calibration of the scale past which the pointer moves depends upon the effect of variations in the signal upon the pointer movement; that is, the scale is graduated and calibrated to suit the pivotal movement of the pointer. In measuring devices of the present invention, the opposite concept is employed. Thus, the scale is graduated and calibrated independently of the relationship between the signal variations and pointer movement. Pointer movement is made to conform to the calibration so as to accurately reflect the measured signal. The invention accomplishes this by providing a variable compensating torque or force acting on the pointer, in addition to the force or torque of the signal.

The invention is illustrated in preferred form in the accompanying drawing, in which:

Figure 1 is a front elevation of a speedometer construction in accordance with the principles of the invention;

Fig. 2 is a cross section taken on line 2—2 of Fig. 1;

Fig. 3 is a cross section taken on line 3—3 of Fig. 2;

Fig. 4 is a plan view with parts broken away of the improved speedometer; and

Fig. 5 is a graph illustrating the manner in which the variable compensating torque is determined.

Figs. 1-3 illustrate an automobile speedometer that contains all the essential elements of a conventional speedometer, plus additional means whereby the improvement of the present invention is achieved. Thus, there is a mounting frame or bracket 1 that has a cross plate 3 and side arms 5 extending normally from opposite ends thereof. The dial plate 7 is secured through the medium of a bracket 9, and suitable screws, to the ends of the arms 5 so as to be parallel to and spaced from the cross plate 3. The bracket 9 includes a cross web 11 that is parallel to the dial and spaced inwardly therefrom and bent clip portions 13 that are secured by screws 15 to the dial plate 7. The odometer mechanism 17 is rotatably supported on the clips 13. It is driven through suitable gearing 19 (Fig. 4) by the toothed portion 20 of the shaft 21 which is journaled in the cross plate 3 and adapted at one end 23 to be drivably coupled to the speedometer cable 25.

The counterbalanced pointer 27 is driven by the shaft 21 through the medium of a conventional magnetic drive. The pointer 27 is mounted at its center of gravity upon a spindle 29 which is journaled in a bearing 31 that is threaded in the crossweb 11 and is also journaled by means of a bearing 33 secured on its end in a bore 35 in the end of shaft 21. The magnetic drive 37 includes speed cup 39 that is fixed on the spindle 29, and a magnet 41 and pole piece 43 that are fixed on shaft 21. The flange of cup 39 fits between the magnet 41 and pole piece 43. Thus, as is well known, rotation of the magnet and pole piece at a speed corresponding to the linear speed of the automobile sets up eddy currents in the cup 39 that cause it to rotate, carrying with it the spindle 29 and the pointer 27. In order to assist the breakaway from zero speed position, a prestressed spiral balance hairspring 45 is connected at one end to a collar 47 fixed on spindle 29 and at its other end secured to a bracket 49 connected to the cross web 11 so as to impose a torque on the pointer tending to nullify the effect of friction in the bearings.

The structure so far described represents a conventional speedometer. Thus, in the absence of the hereinafter-described compensating means, the pointer would be energized by rotation of shaft 21 to assume a position that is substantially directly proportional to the speed of the vehicle. Also, for each change of, for example, ten M. P. H. in the speed of the vehicle, the pointer 27 would swing through substantially identical angular amounts. This relationship controls the graduation and calibration of a conventional scale to indicate the position of the pointer in terms of M. P. H. Thus, with conventional arrangements, if uniform graduations or intervals are desired between calibrations or markings that vary by uniform increments, the scale must be formed on an arc whose center lies on the axis of spindle 29; and if a rectilinear scale is desired, the graduations or intervals between calibrations that vary by uniform increments must be non-uniform. It will be appreciated that in the latter case the intervals or distances between successive calibrations will be smallest in the center of the scale. Thus, the least accuracy is obtained in the critical driving speed range of about 40-80 M. P. H.

Contrariwise, in the present invention, the graduations and calibrations of the scale may be selected to give the desired intervals or artistic effect and the movement of the pointer 27 regulated to conform therewith. Thus, in the preferred form illustrated in the drawings, the scale 51 has graduations 53 that are substantially uniformly spaced, and calibrations 55 (numerical markings indicating vehicle speed) that are of successively uniform increments. The difference then between this scale and the correct scale for the speedometer structure so far described is that the graduations 53, being substantially uniform, are improperly spaced. Hence, in the absence of the compensating torque means provided by this invention, the position of the pointer on the scale when read by the calibrations 55 does not give the true speed of the vehicle. This is so because the position of the pointer is determined by the equilibrium between the predetermined torque of hairspring 45 and the speed responsive torque of the magnetic coupling 37. These factors did not control the arbitrary selection of the graduations of scale 51.

In order that the calibrations 55 of scale 51 may accurately indicate the speed responsible for the position of the pointer 27, the present invention provides an additional torque that, by virtue of its effect upon movement of the pointer, compensates for the differences between the graduations 55 and the natural graduations that, as indicated above, are determined by the equilibrium of the hairspring and magnetic torques. In the present case, the compensating torque is conveniently supplied by a coil tension spring 57 that is connected at one end to a stud 59 on the pointer 27 above the axis of spindle 29, and at its other end to an eye 61 in the slide 63. A line through the eye 61 and axis of spindle 29, it will be observed, defines the vertical bisector or midpoint of the scale 51. The slide 63 has a vertical slot 65 therein through which extends a screw 67 that threads into the dial plate 7. It is obvious that the slot and screw permit vertical adjustment of the slide 63.

In the conventional speedometer of the type illustrated, i. e., one without the compensating torque, the equilibrium position of the pointer is determined by satisfaction of the following relationship between the torques acting on the pointer:

(1) $\qquad M_t = H_t$ where $M_t$ is the torque of the magnetic coupling 37 and thus directly reflects and is dependent upon the speed, and $H_t$ is the torque of the hairspring 45, and therefore dependent upon pointer position, it being noted that at zero speed $H_t$ is negative or acting in the same direction as $M_t$. The magnitude of $M_t$ as an ordinate is plotted in Fig. 5 against the speed of revolution of the magnet 41 and, in this figure, the magnitude of $H_t$ as an ordinate is plotted against the position of pointer 27 in terms of degrees of pivotal movement from the zero speed position, this position being determined by a suitable stop, not shown. These relationships determine the torque required to move the pointer from one angular position to another, and thus reveal the compensating torque necessary to cause the pointer to assume the positions desired on scale 51 at the various speeds. When the compensating torque is supplied, as in the present invention, Equation 1 is changed to the following relationship which governs the position of the pointer:

(2) $\qquad M_t = H_t \pm C_t$ where $C_t$ is the compensating torque. The compensating torque is supplied, of course, by spring 57, so that for the structure illustrated it is the following relationship which determines the position of the pointer 27:

(3) $\qquad M_t = H_t \pm S_t \pm W_t$ where $S_t$ is the torque on the pointer produced by extension of the spring 57, and $W_t$ is the torque on the pointer produced by the weight of the spring 57.

The values of $H_t \pm C_t$ to produce the relationship prescribed by scale 51 are plotted in Fig. 5 as the ordinates against the angular positions of the pointer 27 as the abscissae. It is evident that $C_t$ is equal to the change in magnet torque that is required to cause or allow pointer movement between the two angular positions corresponding to identical speed measurements on the scale of this invention (Equation 3), and the conventional scale which is dependent upon Equation 1. This change in torque is readily ascertained from Equation 1 and Fig. 5.

In the embodiment illustrated, the pointer moves 120° as it covers a speed range of 120 M. P. H., and the midpoint or 60 M. P. H. mark on the scale is the natural angular position of the pointer, so that $C_t$ at the 60-degree position, as measured from the zero speed position, is zero. It will be observed that at the 60-degree position the stud 59, axis 29, and eye 61 will lie in a common vertical line so that the moment arm of the spring 57 is zero, whereby it supplies no compensating torque. $C_t$ is positive in the range from zero to sixty degrees pointer movement, as indicated by the upward divergence of the $H_t \pm C_t$ line in Fig. 5; and, above sixty degrees, the relationship is reversed and $C_t$ is negative, i. e., assists the magnet torque, as seen from Equation 2. Since $H_t$ is directly proportional to the angular position of pointer 27, it is apparent from the curve that $C_t$ is not proportional and, rather, is larger at a position intermediate the zero and sixty-degree positions.

The values of $S_t$ and $W_t$ are plotted in Fig. 5 against the angular position of the pointer. Considering these curves first only qualitatively, it will be observed that $W_t$ may change the inclination of the curve $H_t$, but not its shape. $W_t$ may be defined by the product of the spring weight and the integral with respect to the change in angular position of the change in moment arm of the center of gravity of the spring 57. It is clearly a linear function of the pointer angle. $S_t$, however, is not such a linear function and may be defined as the product of the spring rate and the double integral with respect to the change of pointer angle of the change in length of spring 57 and the change in moment arm of the spring force. It will be noted that it varies qualitatively in the manner required of $C_t$. Thus, qualitatively, the curve $H_t \pm S_t \pm W_t$ is the same as the curve $H_t \pm C_t$. Hence, by conventional mechanical and mathematical processes, employing either or both the calculus and cut-and-try methods, the relative locations of the elements 59, 29, and 61, and the structure of the spring 57 may be ascertained for any given speedometer structure of the type described, to give substantial quantitative identity as well as to these two curves.

Four examples of the approximation to the required $C_t$ that may be obtained readily by cut-and-try methods are set forth below. These examples employ two different springs 57 and two different initial settings of a selected hairspring 45. The pointer angles calculated for each of these examples are compared in the table below with the required pointer angle for each graduation 53, assuming equal intervals between graduations. In these examples, the distance between stud 59 and spindle 29 is one-quarter inch, and the distance between eye 61 and spindle 29 is one inch.

*Example 1.*—A hairspring 45 having a rate of .025 gram cm./degree with an initial set of 5 degrees is used so that $M_t$ at 60 M. P. H. is 1.375 gram cm. The rate of spring 57 is 11 grams/inch and its weight is .03 gram. Its initial unstressed length is therefore required to be 1.115 inches.

*Example 2.*—Same as Example 1, except that rate of spring 57 is 12 grams/inch. Its initial length is therefore 1.118 inches.

*Example 3.*—Same as Example 1, except that the initial set of hairspring 45 is 3 degrees. Then $M_t$ at 60 M. P. H. is 1.425 gram cm. and the free or unstressed length of spring 57 is 1.122 inches.

*Example 4.*—Same as Example 3, except that rate of spring 57 is 12 grams/inch. Its free or unstressed length is then 1.125 inches.

| M. P. H. | Required Pointer Angle | Actual Pointer Angle | | | |
|---|---|---|---|---|---|
| | | Ex. 1 | Ex. 2 | Ex. 3 | Ex. 4 |
| 0 | 0 | 0 | 0 | 0 | 0 |
| 10 | 4.7 | 4.7 | 4.7 | 4.7 | 4.7 |
| 20 | 10.9 | 11.5 | 11.2 | 11.5 | 11.0 |
| 30 | 19.1 | 19.3 | 18.8 | 19.5 | 19.0 |
| 40 | 30.0 | 29.0 | 28.3 | 29.5 | 28.5 |
| 50 | 43.9 | 41.6 | 41.0 | 42.8 | 41.5 |
| 60 | 60.0 | 60.0 | 60.0 | 60.0 | 60.0 |
| 70 | 76.1 | 78.4 | 79.0 | 77.2 | 78.5 |
| 80 | 90.0 | 91.0 | 91.7 | 90.5 | 91.5 |
| 90 | 100.9 | 100.7 | 101.2 | 100.5 | 101.0 |
| 100 | 109.1 | 108.5 | 108.8 | 108.5 | 109.0 |
| 110 | 115.3 | 115.3 | 115.3 | 115.3 | 115.3 |
| 120 | 120.0 | 120.0 | 120.0 | 120.0 | 120.0 |

As the table shows, rather close approximation is obtained and better results may be achieved by further selection and calculation. It will be observed that exact accuracy may be obtained without sacrificing the appearance of uniform graduations by shifting the graduations slightly so that they make the actual pointer angle indicated for a selected set of conditions. It will also be evident that while employing equal graduations it is possible to make the scale read fast at higher speeds, if desired.

In the examples, the distance between stud 59 and eye 61 at the zero pointer angle is 1.142 inches and greater than the free length of any of the springs 57. The latter will, therefore, be under initial tension. The zero position stressed length of the spring 57 may be varied by adjustment of the slide 63 and this will, of course, affect $C_t$. The initial stress in the spring 57 acts in opposition to that in hairspring 45 and will therefore increase the magnet torque required for the breakaway from zero position if no increase in setting of the hairspring is made. These factors may be taken into consideration in the selection and setting of the spring 57 (and hairspring 47) to obtain a breakaway at the desired speed. The curves of Fig. 5 show a breakaway at about 4 M. P. H., but it should be noted that these curves are not plotted from the data of any of the above examples though they approximate such data.

It is evident that modifications may be made in the specific structure illustrated without departing from the spirit and scope of the invention.

What is claimed is:

1. In a measuring device, the combination of a pivotal pointer, yieldable means urging the pointer toward an initial position, signal responsive means applying a torque to the pointer in opposition to said yieldable means and adapted to cause the pointer to assume an angular position indicative of the magnitude of the signal, a scale graduated and calibrated substantially independently of the relationship between the angular position and magnitude of signal imposed by said means on the pointer whereby, if actuated exclusively by said means, calibrations corresponding to the position of the pointer do not indicate the true value of the signal received, and means applying a compensating torque to the pointer adapted to correct the angular position of the pointer so that its position on the scale indicates substantially the true value of the signal received.

2. In a measuring device, the combination of a graduated and calibrated scale, a pivotal pointer arranged to sweep the scale, signal responsive means including a resisting torque and a signal actuated torque operatively attached to the pointer to urge it to assume certain angular positions dependent upon the magnitude of the signal, said scale having spaced graduations and calibrations associated with the graduations to indicate the pointer position in terms of the signal being measured, the graduations being spaced apart by intervals different than the intervals of pointer movement resulting from a change in signal when the pointer is under the sole influence of the means, the magnitude of the signal being indicated by the difference between successive calibrations and means applying a compensating torque to the pointer so that changes in signal of the magnitude defined by successive scale calibrations results in pointer movement substantially equal to the interval between the graduations associated with the calibrations.

3. In a speedometer or the like, the combination of a frame, a rectilinear scale secured to the frame having substantially equally spaced graduations and uniform calibrations, a pointer for the scale, means mounting the pointer on the frame for pivotal scale sweeping movement about a fixed axis, and means for pivotally moving the pointer to strike off substantially equal intervals on the scale upon equal changes in speed, said last mentioned means comprising speed responsive means for pivotally moving the pointer through uniform angular displacements for equal changes in speed and spring means applying a variable torque to the pointer that assists the pointer during a portion of its travel and resists the pointer during substantially the entire balance of its travel.

4. In a speedometer or the like, the combination of a frame, a rectilinear scale secured to the frame having substantially equally spaced graduations and uniform calibrations, a pointer for the scale, means mounting the pointer on the frame for pivotal scale sweeping movement about a fixed axis, and means for pivotally moving the pointer to strike off substantially equal intervals on the scale upon equal changes in speed or the like, said last means including speed responsive, torque-providing means and also resilient, variable, torque-providing means that is independent of the speed but dependent upon the angular position of the pointer.

5. In a speedometer, the combination of a frame, a rectilinear scale secured to the frame having substantially equally spaced graduations and uniform calibrations, a pointer for the scale, means mounting the pointer on the frame for pivotal scale sweeping movement about a fixed axis, speed actuated means for applying a torque to the pointer, yieldable means operative throughout substantially the entire travel of the pointer for biasing the pointer to a predetermined initial position and resilient means for applying a torque to the pointer of a magnitude dependent upon the angular position of the pointer and such that the position of the pointer on the scale as determined by the equilibrium of the torques of the speed actuated means and the resilient means and the yieldable means provides a substantially correct indication of the actual magnitude of the speed actuating the speed actuated means.

6. In a speedometer, the combination of a frame, a rectilinear scale secured to the frame having substantially equally spaced graduations and uniform calibrations, a pointer for the scale, means mounting the pointer on the frame for pivotal scale sweeping movement about a fixed axis, speed actuated means for applying a torque to the pointer, first resilient torque applying means for assisting the breakaway of the pointer at low speed and thereafter through the entire range of pointer travel resisting movement of the pointer which is actuated by the speed actuated means, and second resilient torque applying means for assisting the first resilient means during one portion of the range of pointer travel and for assisting the speed actuated means during another portion of the range of pointer travel.

7. In a speedometer, the combination of a frame, a rectilinear scale secured to the frame having substantially equally spaced graduations and uniform calibrations, a pointer for the scale, a spindle pivotally supported on said frame, said pointer being secured on the spindle, a speed actuated magnetic coupling operatively connected to the spindle, a balance spring operatively connected to the spindle to apply a torque to the pointer in opposition to the magnet torque and in direct proportion to the amount of angular movement of the pointer from its initial zero position, and spring means operatively connected to the pointer to provide a compensating torque whereby the equilibrium positions of the pointer at various speeds indicate such speeds on said scale, the line of force of said spring means having a variable moment arm with respect to the pointer pivot axis and passing through the pivot axis at an intermediate position of the pointer on the scale.

8. In a speedometer, the combination of a frame, a rectilinear scale secured to the frame having substantially equally spaced graduations and uniform calibrations, a pointer for the scale, a spindle pivotally supported on said frame, said pointer being secured on the spindle, a speed actuated magnetic coupling operatively connected to the spindle, a balance spring operatively connected to the spindle to apply a torque to the pointer in opposition to the magnet torque and in direct proportion to the amount of angular movement of the pointer from its initial zero position, and spring means operatively connected to the pointer to provide a compensating torque whereby the equilibrium positions of the pointer at various speeds indicate such speeds on said scale.

9. In a measuring device, the combination of a dial having a graduated and calibrated scale thereon, a pivotal pointer adapted to sweep the scale, means for applying a signal torque to the pointer, resilient torque means for resisting movement of the pointer through substantially the entire range of pointer travel and a coil spring operatively connected at one end to the pointer and at its other end to a fixed point, said ends being secured so that the line of force of the spring passes across said pivot axis when said pointer reaches a predetermined position on the scale.

References Cited in the file of this patent

UNITED STATES PATENTS

| Number | Name | Date |
|---|---|---|
| 568,046 | Spratt | Sept. 22, 1896 |
| 797,500 | Cowey | Aug. 15, 1905 |
| 1,042,122 | Kocourek | Oct. 22, 1912 |
| 1,884,264 | Ruopp | Oct. 25, 1932 |
| 1,989,547 | Clark | Jan. 29, 1935 |
| 2,549,754 | Bosch | Apr. 24, 1951 |

FOREIGN PATENTS

| Number | Country | Date |
|---|---|---|
| 761,293 | France | Jan. 3, 1934 |